June 1, 1943.  H. E. SCHROEDER  2,320,387
ATTACHMENT FOR PORTABLE IMPLEMENTS
Filed June 4, 1940  2 Sheets-Sheet 1
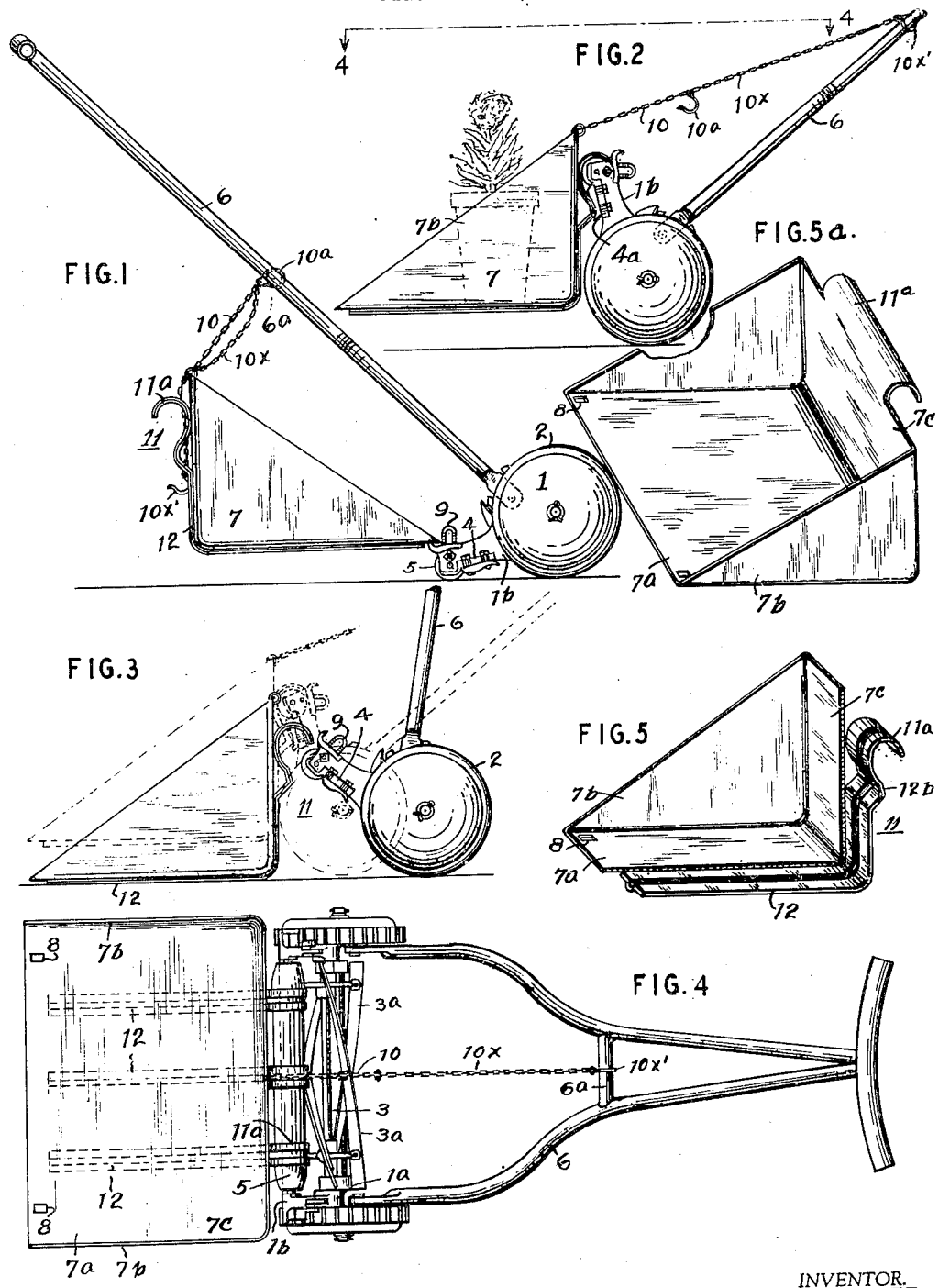
INVENTOR.
HARRY E. SCHROEDER.
BY Geo. B. Pitts
ATTORNEY.

June 1, 1943.  H. E. SCHROEDER  2,320,387
ATTACHMENT FOR PORTABLE IMPLEMENTS
Filed June 4, 1940  2 Sheets-Sheet 2
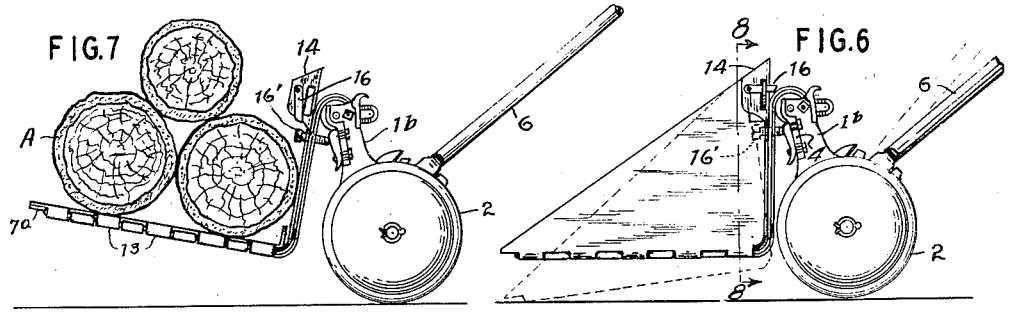
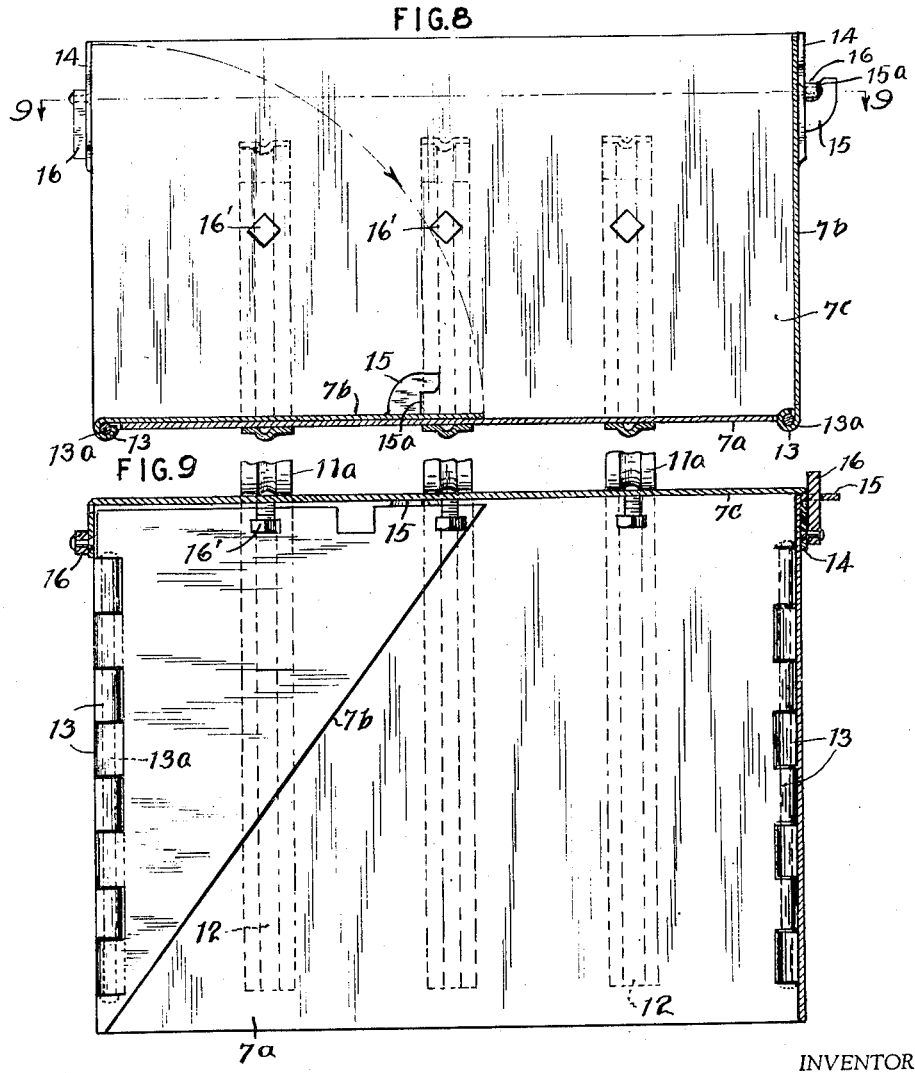
INVENTOR.
HARRY E. SCHROEDER.
BY
Geo. B Pitts
ATTORNEY.

Patented June 1, 1943

2,320,387

UNITED STATES PATENT OFFICE 2,320,387

ATTACHMENT FOR PORTABLE IMPLEMENTS

Harry E. Schroeder, Cleveland, Ohio

Application June 4, 1940, Serial No. 338,741

8 Claims. (Cl. 280—51)

This invention relates to an attachment for a lawn-mower whereby the latter may be utilized as a wheeled support for carrying loads from place to place.

One object of the invention is to provide an improved attachment for a lawn-mower, adapted to be detachably connected to the mower to serve as a collector or as a support for loads, whereby the latter may be carried from place to place.

Another object of the invention is to provide an improved attachment arranged to be removably connected to separate parts of a lawn-mower, so as to serve as a receiver for the clipped grass and like material when the mower is moved in one direction for mowing or to serve as a load carrier when the mower is moved in the reversed direction.

Other objects of the invention will be apparent to those skilled in the art to which my invention relates from the following description taken in connection with the accompanying drawings, wherein Fig. 1 is a side elevation of a lawn-mower and an attachment embodying my invention; the mower being in its normal position for mowing and the attachment being disposed to collect the clipped material.

Fig. 2 is a side elevation of the lawn-mower and the attachment; the mower being reversed and the attachment positioned for carrying a load.

Fig. 3 is an elevation showing the operation of connecting the mower to the attachment when the latter is to be used as a load carrier.

Fig. 4 is a plan view of the parts as shown in Fig. 2.

Fig. 5 is a perspective sectional view.

Fig. 5a is a perspective view of a modified form of construction.

Fig. 6 is a view similar to Fig. 2 but showing another modified form of construction.

Fig. 7 is a view of the parts shown in Fig. 6, illustrating the manner of carrying a load.

Fig. 8 is a section on the line 8—8 of Fig. 6, enlarged; one of the side walls being folded down.

Fig. 9 is a section on the line 9—9 of Fig. 8.

In the drawings, referring particularly to Figs. 1 to 5, 1 indicates as an entirety a lawn mower of the usual construction comprising a frame 1a having arms 1b, supporting wheels 2 drivingly connected to the cutter carrying shaft 3, a bed knife carrying cross bar 4 secured to the arms 1b, a trailing roller 5 mounted on the arms 1b and a handle 6. 7 indicates an attachment having a bottom wall 7a, end walls 7b and a rear wall 7c. These walls may be formed of various materials, including wire netting, canvas or other flexible material, but for illustrative purposes they are shown as formed of sheet metal. Obviously when formed of wire netting or flexible material, reinforcing strips will be required to give shape or form as well as strength to the attachment. The bottom wall adjacent its outer end and at opposite sides thereof is provided with apertures 8 for engagement with engaging elements 9 provided on the arms 1b and the rear wall 7c is provided with a connecting device 10 which is suitably connected to some part of the handle, for example, by means of a hook 10a engaging a cross bar 6a. When the attachment is to be used during the operation of the mower for mowing a lawn or other area, the attachment 7 is mounted as shown in Fig. 1, that is, suspended by the arms 1b and handle 6, rearward of the cutters 3a, whereby the attachment collects the clippings cut and discharged rearwardly by the cutters. For mounting the attachment 7 in this position, the engaging means 8 are shown as consisting of openings formed in the bottom wall 7a and the engaging elements 9 on the arm 1b consist of up-standing lugs which extend through the openings, to detachably connect the bottom wall 7a to the arms 1b. The connecting device 10 preferably consists of a chain having a hook 10a which engages a cross bar 6a on the handle 6.

In the form of lawn mower shown, when the handle 6 is swung from its normal position for rolling the mower forwardly (as shown in Fig. 1) to the position for rolling the mower rearwardly or in its non-cutting direction, the frame 1a is rotated a partial turn, which movement swings the outer ends of the arms 1b, the bed knife supporting bar 4 and trailing roller 5 into an elevated position, whereby one or certain of these parts may be utilized to support the attachment to permit the mower to be used as a conveyor or truck for carrying loads of material from place to place, as shown in Figs. 2 and 4. The attachment 7 is provided with means 11 for removably engaging one or certain of these parts when in their elevated position. In the preferred arrangement the engaging means 11 is constructed to engage with and be mounted on the trailing roller 5. For this purpose I provide on the rear wall 7c a curvilinear member or hook 11a which fits over the trailing roller 5. When the attachment 7 and mower are to be used as a truck, the handle 6 is swung to the opposite side of the axis of the wheels 2, in position to roll the mower on its supporting wheels 2 independently of the cutters 3a and the hook 11a is engaged over the roller 5, with the rear wall below bearing against the bed knife 4a, the latter and the roller serving to support the attachment 7 as shown in Fig. 2, and thus adapt it to carrying of loads of various kinds. The engagement and mounting of the attachment 7 on the mower may be effected by placing the attachment on the ground and positioning the arms 1b as shown in Fig. 3 and then rolling the mower toward the rear wall of the attachment and moving the handle 6 to the position shown in dotted lines in Fig. 3, which movement projects the roller 5 into the hook 11a and raises the attachment upwardly. The hook 11a may be provided by extending the rear wall 7c upwardly and curving it upwardly, outwardly and downwardly as shown in Fig. 5a. The hook 11a in this form of construction is of less length than that of the rear wall 7c so as to fit mowers of different widths. By preference, I provide a plurality of spaced reinforcing members 12, formed from bar metal, and corrugated from end to end, these members being bent to provide horizontal and vertical portions which are spot-welded to the bottom wall 7a and rear wall 7c. The upper ends of the vertical portions of the members 12 are curved outwardly and downwardly to form alined hooks 11a and below the hooks each member is provided with an off-set 12b which forms a pad to bear against the bed knife 4a.

Figs. 6 to 10, inclusive, illustrate a modified form of attachment. In this form of construction each side wall 7b is hinged along its lower edge to the adjacent side edge of the bottom wall 7a, whereby the side walls 7b may be folded inwardly and positioned on the bottom wall, so that bodies (such as shown at A) having a length greater than the width of the bottom wall may be positioned on the attachment and transported (see Fig. 7). The lower edge of each side wall 7b and the adjacent edge of the bottom wall 7a may be provided with related knuckles 13 through which a pin 13a extends to provide the pivot for the knuckles. Each side wall may be locked in its vertical position in any desired manner. For this purpose I provide on the rear wall a flange 14 which extends toward the outer end of the bottom wall 7a to form a stop for the adjacent side wall 7b and on the latter wall I provide an outwardly extending lug 15 which is notched, as shown at 15a, so that a dog 16, pivoted on the flange 14 may be positioned in the notch 15a and thus removably secure the side wall 7b and rear wall 7c together.

The rear wall 7a and the central reinforcing member 12 are formed with alined threaded openings for a bolt 16', the inner end of which bears against the bed knife 4a, as shown in Fig. 6. By turning the bolt 16' to thread it through the openings, the attachment may be adjusted into an inclined position, as shown in Fig. 7 to facilitate the carrying of loads. I prefer to provide an adjusting bolt in each member 12. Where the adjusting bolts 16' are provided, the off-sets 12b may be omitted, as the bolts will serve to support the attachment away from the wheels 2 and other parts of the mower.

By preference, the chain is provided with an extended portion 10x carrying at its outer end a hook 10x' which engages the cross bar 6a (see Fig. 4).

By swinging the handle 6 forwardly and inclining the attachment downwardly to bring the outer edge of the bottom wall 7a into engagement with the ground, as shown in dotted lines in Fig. 6, the load may be rolled on to the bottom wall or loose material pushed or swept thereon.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A combined collecting and load-carrying attachment for a portable implement mounted on a pair of wheels and having a handle and inner and outer cross members disposed parallel to the axis of said wheels and outwardly of their peripheries, comprising a bottom wall and a rear wall arranged to removably rest against said inner cross member and provided with a device adapted to removably engage said outer cross member and be suspended thereby.

2. In mechanism for conveying loads and materials, the combination with a wheeled implement comprising a frame, a pair of supporting wheels for said frame, a trailing roller on said frame disposed parallel to the axis of said wheels outwardly of their peripheries and a handle for rolling said implement and arranged to rock said frame about the axis of said wheels to elevate the trailing roller, of a carrier having a bottom wall and a rear wall, said rear wall being arranged to engage said frame inwardly of said roller and provided with a device removably engaging said trailing roller for supporting said carrier on said frame.

3. An attachment as claimed in claim 1 wherein said attachment is provided with end walls hinged along their lower edges to the side edges of said bottom wall and detachable means are provided for supporting said walls vertically.

4. An attachment for a portable implement mounted on a pair of wheels and having a handle and inner and outer cross members disposed parallel to the axis of said wheels and outwardly of their peripheries, comprising a bottom wall and a rear wall arranged to removably rest against said inner cross member, the upper end portion of the rear wall being extended and bent laterally to form a device arranged to removably engage the outer cross member for supporting the attachment on the implement.

5. In mechanism for conveying loads and materials, the combination with a portable implement comprising a frame and a pair of supporting wheels therefor, said frame having a pair of spaced arms extending substantially radially of the axis of said wheels beyond the peripheries thereof and supporting between them at their outer ends a cross member, of a carrier having a bottom and a rear wall, a hook adjacent the upper end portion of the rear wall for removably engaging said cross member, whereby said carrier may be suspended therefrom, and a handle operatively connected to said frame and arranged to swing the latter about the axis of said wheels in one direction to support said carrier in load transporting position or in the opposite direction to incline the carrier in position to receive material, said frame when swung in the last mentioned direction to an abnormal position and rolled away from said carrier being arranged to disengage the cross member from said hook and discharge the carrier on the ground or other surface.

6. A load carrying attachment comprising a bottom, a rear wall and end walls, said end walls being hinged along their lower side edges to the opposite side edges of said bottom and foldable downwardly into face to face engagement therewith, detachable means between said rear wall and said end walls for securing the latter in their vertical positions, and an attachment element on said rear wall adapted to removably engage a supporting member on a portable implement.

7. A load carrying attachment comprising a bottom wall, a rear wall and end walls, each of said end walls being hinged along one edge to one of said walls and foldable into face-to-face relation thereto, detachable means for supporting said end walls in angular relation to said bottom wall and rear wall, and hook means arranged adjacent the upper end portion of said rear wall for removable suspension on a wheeled implement.

8. A load carrying attachment comprising a bottom, a rear wall and end walls, said end walls being hinged along their lower side edges to the opposite side edges of said bottom and foldable downwardly in face-to-face relation thereto, detachable means between said rear wall and said end walls for securing the latter in vertical position, and a plurality of laterally spaced members underlying the bottom and rear wall and terminating near the upper end portion of said rear wall in a series of spaced alined hooks adapted to removably engage a supporting element on a portable implement and be suspended therefrom.

HARRY E. SCHROEDER.